April 15, 1924.  G. BROWN ET AL  1,490,361
BARREL TRUCK
Filed March 11, 1921    2 Sheets-Sheet 2

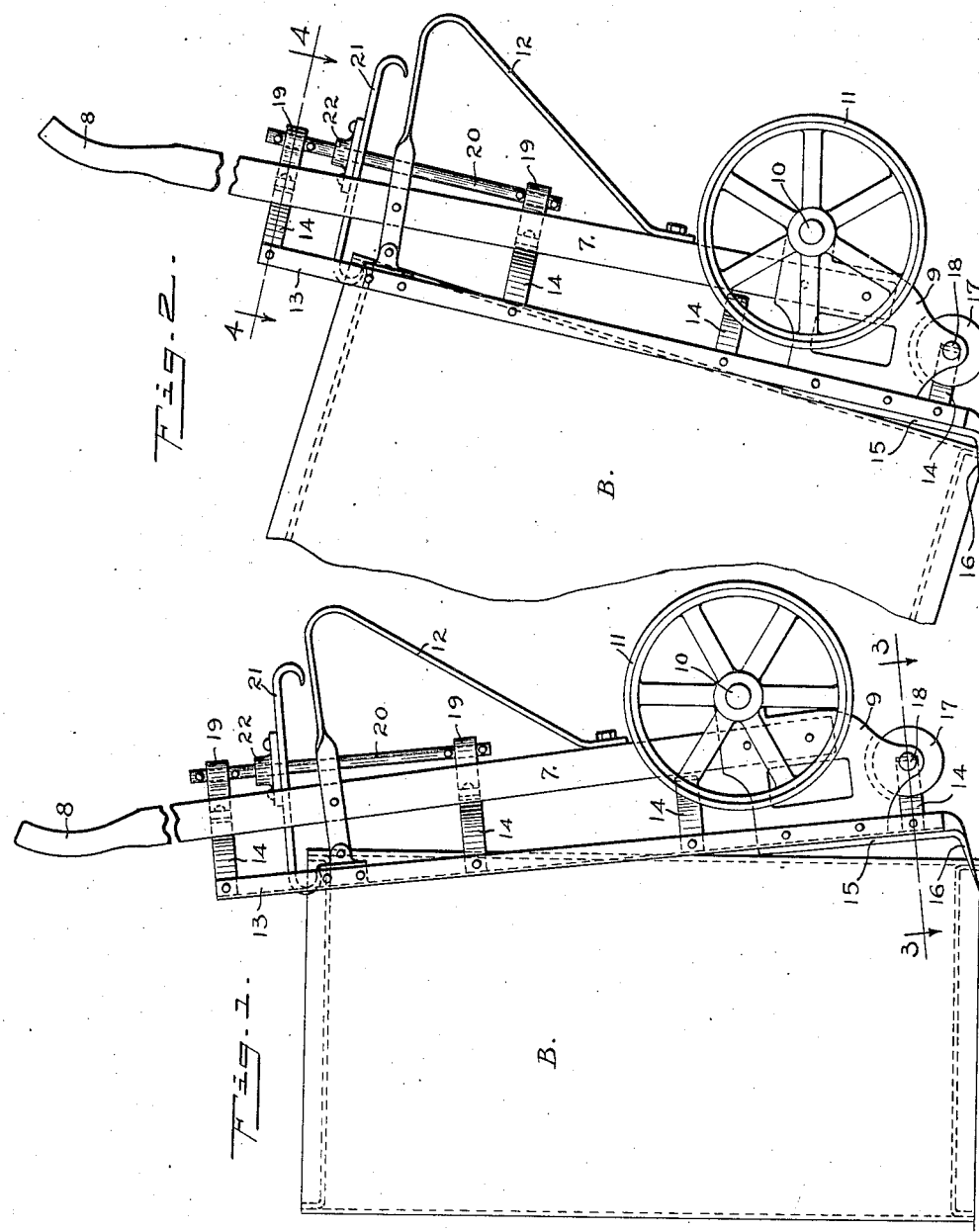

Inventors:
GRANT BROWN.
C. A. SIGAFOOS.
By David O. Barnell,
Attorney

Witness:
R. J. Honomichl.

Patented Apr. 15, 1924.

1,490,361

UNITED STATES PATENT OFFICE.

GRANT BROWN AND CLARK A. SIGAFOOS, OF OMAHA, NEBRASKA.

BARREL TRUCK.

Application filed March 11, 1921. Serial No. 451,531.

*To all whom it may concern:*

Be it known that we, GRANT BROWN and C. A. SIGAFOOS, citizens of the United States, and residents of Omaha, in the county of Douglas and State of Nebraska, have invented certain new and useful Improvements in Barrel Trucks, of which the following is a specification.

Our invention relates to hand-operated barrow-type trucks especially adapted for the transportation of cylindrical or fusiform containers having chimed ends. It is the object of our invention to provide in a truck of the character indicated simple and convenient means by which a barrel may be lifted from a floor and deposited in the cradle of the truck without being lifted or manually engaged by the workman using the truck.

Figure 3:
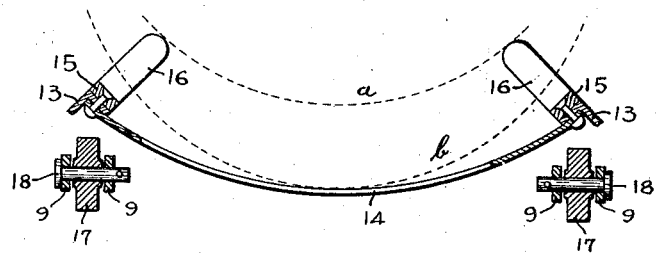
Figure 4:
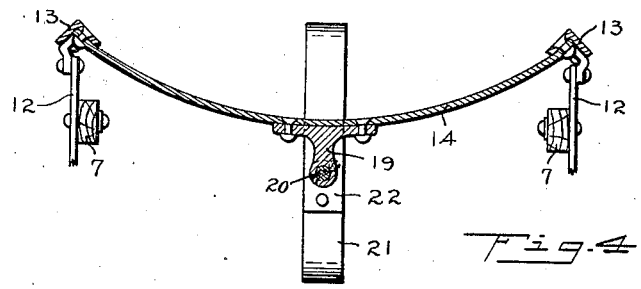
Figures 5, 6:
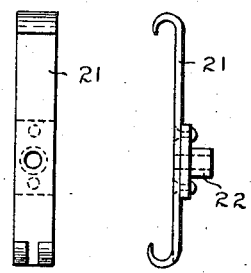

A construction embodying our invention is illustrated in the accompanying drawings, wherein Fig. 1 is a side view of the truck in the position at which a barrel is first engaged, Fig. 2 is a similar view showing the barrel tilted and the lips entering beneath the lower end thereof, Fig. 3 is a detail transverse section on the line 3—3 of Fig. 1, Fig. 4 is a detail transverse section on the line 4—4 of Fig. 2, and Figs. 5 and 6 are respectively detail bottom and side views of the chime-hook.

In the illustrated structure we provide a body or frame having wooden side-pieces 7 terminating in handles 8 and secured at their lower ends to metal side-plates 9 in which is mounted a cross-shaft 10 having the wheels 11 at the ends thereof. Leg-members 12, secured to the side-pieces 7 as shown, are adapted to support the rear portion of the frame when the same is in a horizontal position. Portions of the leg-members and of the side-plates 9 extend forwardly from the side-pieces 7 and have secured thereto the cradle side-bars 13 which are preferably formed by pieces of angle-iron as shown. A series of curved cross-bars 14 have the ends thereof secured to the side-bars 13 and form a concave bed or cradle, while constituting the transverse connecting members of the truck-frame. On the lower portions of the side-bars 13 are secured the bars 15 which have at their lower ends forwardly and inwardly extending wedge-shaped lips 16.

The lower extremities of the side-plates 9 are forked to receive small wheels 17, which are revolubly mounted therein on short transverse pins 18. As shown in Figs. 2 and 3, the wheels 17 are located immediately behind the side-bars 13 and in such relation to the lips 16 as to engage the floor simultaneously with said lips when the latter are parallel with the floor-surface.

On the rear side of the two upper cross-bars 14, at the centers thereof, are secured the brackets 19, and in said brackets are held the ends of a rod 20 on which the chime-hook is mounted slidably and rotatably. The chime-hook comprises a bar 21 having a downwardly curved portion or hook at each end thereof, and having intermediate its ends, but dissymmetrical thereto, a hub or guide-block 22 through which the rod 20 passes. By rotating the bar 21 about the rod 20 either of the hooked ends may be engaged with the chime at the upper end of a barrel, the bar being moved vertically upon the rod according to the height of the barrel.

The method of operation in loading a barrel onto the truck will be apparent from Figs. 1 and 2. Approaching one side of the barrel, the lips 16 are caused to straddle the barrel as far as possible, the truck-body being tilted forwardly and the ends of the lips 16 resting upon the floor as shown in Fig. 1, so that the relation of the barrel to said lips is approximately as indicated by the dotted circular arc $a$ in Fig. 3. The chime-hook is then engaged with the upper end of the barrel, and the handles 8 pulled rearwardly whereby to tilt the barrel as shown in Fig. 2. When the small wheels 17 engage the floor, the lower end of the truck moves forwardly and the lips 16 pass beneath the lower end of the barrel which, on account of the tilted position thereof, is raised from the floor at the points vertically coincident with the lips 16. Then by continued rearward movement of the handles the barrel is lifted clear of the floor, being supported upon the lips and resting well back within the cradle, and at the same time the main supporting wheels 11 engage the floor, while the small wheels 17 swing up away from the floor. The truck is then manipulated in the usual way until the barrel has been moved to the desired location, when it is discharged or unloaded from the truck by substantially a reversal of the loading operation. It will be seen that in the unloading operation, after the truck has been tilted forwardly far enough to engage the barrel with the floor, but while the barrel is still tilted as in Fig.

2, the engagement of the small wheels 17 with the floor enables the lower portion of the truck to move backward easily, far enough to displace the lips 16 from beneath the barrel. It will be noted further that while the main truck-wheels 11 are so located as to cause the usual balancing of the load, and to prevent excessive weight upon the handles 8 while the truck is being moved from place to place, the small wheels 17 are located so close to the lips 16, by which the barrel is first lifted from the floor, that the initial lifting of the load is very easily performed, the truck-body being in effect a lever fulcrumed on the pins 18, with the short arm of the lever formed by the lips 16 and the long arm formed by the handles 8 and sidepieces 7.

Now, having described our invention, what we claim and desire to secure by Letters Patent is:

The combination with a barrow-type truck having means for engaging the upper portion of a barrel to tilt the same by movement of the truck-body away from the barrel, and laterally spaced forwardly projecting fingers fixedly secured at the lower portion of the truck-body and adapted to straddle the lowermost portion of a barrel in tilted position whereby to enter beneath the raised bottom portion thereof, of small auxiliary wheels mounted on the truck-body closely behind the spaced fingers and engageable with the floor to movably support the truck-body during the entry of said spaced fingers beneath the barrel at points raised by the tilting thereof and while the edge of the barrel at a point intermediate said fingers remains in contact with the floor, said fingers and auxiliary wheels being so proportioned and arranged that the action of tilting the barrel tends to move the lower portion of the truck-body forwardly to automatically effect insertion of the fingers beneath the raised lower edge thereof.

GRANT BROWN.
CLARK A. SIGAFOOS.